(12) United States Patent
Deng et al.

(10) Patent No.: US 9,753,826 B2
(45) Date of Patent: Sep. 5, 2017

(54) PROVIDING FAULT INJECTION TO CLOUD-PROVISIONED MACHINES

(71) Applicant: International Business Machines Corporation, Armonk, NY (US)

(72) Inventors: Yu Deng, Yorktown Heights, NY (US); Ruchi Mahindru, Elmsford, NY (US); Anca Sailer, Scarsdale, NY (US); Soumitra Sarkar, Cary, NC (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 124 days.

(21) Appl. No.: 14/804,528

(22) Filed: Jul. 21, 2015

(65) Prior Publication Data

US 2017/0024299 A1    Jan. 26, 2017

(51) Int. Cl.
*G06F 11/263* (2006.01)
*G06F 11/34* (2006.01)

(52) U.S. Cl.
CPC ........ *G06F 11/263* (2013.01); *G06F 11/3414* (2013.01)

(58) Field of Classification Search
USPC .......................................................... 714/41
See application file for complete search history.

(56) References Cited

U.S. PATENT DOCUMENTS

| 6,484,276 | B1* | 11/2002 | Singh | G06F 11/263 |
| | | | | 714/38.13 |
| 6,701,460 | B1* | 3/2004 | Suwandi | G06F 11/2215 |
| | | | | 714/38.1 |
| 7,185,232 | B1* | 2/2007 | Leavy | H04L 12/2697 |
| | | | | 714/32 |
| 7,404,107 | B2 | 7/2008 | Burk | |
| 7,757,215 | B1* | 7/2010 | Zhou | G06F 11/3644 |
| | | | | 714/2 |
| 9,483,383 | B2 | 11/2016 | Baset et al. | |
| 2004/0054695 | A1* | 3/2004 | Hind | G06F 11/3636 |

(Continued)

FOREIGN PATENT DOCUMENTS

WO    2008048418 A2    4/2008

OTHER PUBLICATIONS

Hanawa et al., "Customizing Virtual Machine with Fault Injector by Integrating with SpecC Device Model for a Software Testing Environment D-Cloud", IEEE 2010.

(Continued)

*Primary Examiner* — Kamini Patel
(74) *Attorney, Agent, or Firm* — Ryan, Mason & Lewis, LLP

(57) ABSTRACT

Methods, systems, and computer program products for providing fault injection to Cloud-provisioned machines are provided herein. A method includes determining one or more fault conditions to be associated with a fault injection implementation based on one or more parameters associated with a request for the fault injection implementation; generating a specification for a lifecycle of the fault injection implementation based on the one or more fault conditions; and executing the fault injection implementation in a target system, wherein said executing comprises effecting the lifecycle of the fault injection implementation according to the generated specification.

19 Claims, 2 Drawing Sheets

(56) References Cited

U.S. PATENT DOCUMENTS

| | | | |
|---|---|---|---|
| 2008/0215925 A1* | 9/2008 | Degenaro | G06F 11/263 714/41 |
| 2010/0287535 A1 | 11/2010 | Kim et al. | |
| 2013/0096902 A1* | 4/2013 | Bose | G01R 31/31835 703/14 |
| 2013/0246853 A1 | 9/2013 | Salame | |
| 2013/0276056 A1 | 10/2013 | Epstein | |
| 2014/0136896 A1* | 5/2014 | Tak | G06F 11/079 714/26 |
| 2014/0137078 A1* | 5/2014 | Agha | G06F 9/45516 717/114 |
| 2015/0161025 A1* | 6/2015 | Baset | G06F 11/3612 714/38.1 |
| 2015/0369865 A1* | 12/2015 | Hershman | H03K 19/003 326/8 |
| 2016/0371134 A1* | 12/2016 | Raghavendra | G06F 11/0721 |

OTHER PUBLICATIONS

Wikipedia, Fault Injection, https://en.wikipedia.org/w/index.php?title=Fault_injection&oldid=650150792, Mar. 6, 2015.
GitHub, Chaos Monkey, https://github.com/Netflix/SimianArmy/wiki/Chaos-Monkey, Jan. 5, 2015.

* cited by examiner

US 9,753,826 B2

PROVIDING FAULT INJECTION TO CLOUD-PROVISIONED MACHINES

FIELD

The present application generally relates to information technology, and, more particularly, to fault injection techniques.

BACKGROUND

Fault injection (FI) is commonly used for evaluating the resilience of systems. Existing FI approaches, however, involve a significant amount of manual decision making, such as determining, for example, what type of errors should be injected, when a fault should be injected, which object, component, process, and/or software-stack-level should be the target of the fault injection, which value and/or variable in the target object, component, process, and/or software-stack-level should be injected with what erroneous value, and what workload should be used for fault injection trials. Such approaches, accordingly, are inefficient, costly and time-consuming to carry out.

SUMMARY

In one aspect of the present invention, techniques for providing fault injection to Cloud-provisioned machines are provided. An exemplary computer-implemented method can include steps of determining one or more fault conditions to be associated with a fault injection implementation based on one or more parameters associated with a request for the fault injection implementation; generating a specification for a lifecycle of the fault injection implementation based on the one or more fault conditions; and executing the fault injection implementation in a target system, wherein said executing comprises effecting the lifecycle of the fault injection implementation according to the generated specification.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes an intelligent service providing fault injection to Cloud-provisioned machines. An example embodiment of the invention can be implemented as a service that can be provided to customers, administrators, or other users for conducting fault injection onto specified machines, applications, and/or systems automatically, thereby minimizing human intervention. By way of example, representational state transfer (REST) application programming interface (API) requests may form the invocations.

At least one embodiment of the invention includes intelligently generating multiple decisions required by a fault injection process based on one or more inputs and forms of feedback. The inputs for the decisions can be derived from knowledge about the target machines, application and/or systems. The knowledge can be derived, for example, from management tools, monitoring capabilities, collected performance data, predefined virtual machine (VM) images, history of the application and/or system behavior, workload history, etc. As noted, one or more embodiments of the invention can additionally include feedback-based refinement of the decisions, carried out iteratively, for example.

Additionally, at least one embodiment of the invention includes generating a service that, when implemented, intelligently performs procedures required during a fault injection lifecycle. In such a service, deployment steps adapt to the specified target machines, applications, and/or systems. Also, such a service plans and sets-up the given fault injection campaign based on intelligent decision making, as well as user-provided input information. Further, as detailed herein, such a service orchestrates each fault injection experiment and generates a reliability evaluation.

At least one embodiment of the invention includes utilizing machine learning and data pertaining to past FI experiences to process and generate decisions for present FI instances. Also, as described herein, feedback from FI results can be leveraged to refine the decision-making mechanism. In addition to intelligently and automatically performing all procedures in the fault injection life-cycle, one or more embodiments of the invention include generating an overall specification of an entire given fault injection process. Such a specification can include per-FI-experiment workload, deployment steps, FI life-cycle driving, fault specification, etc.

Figure 1:
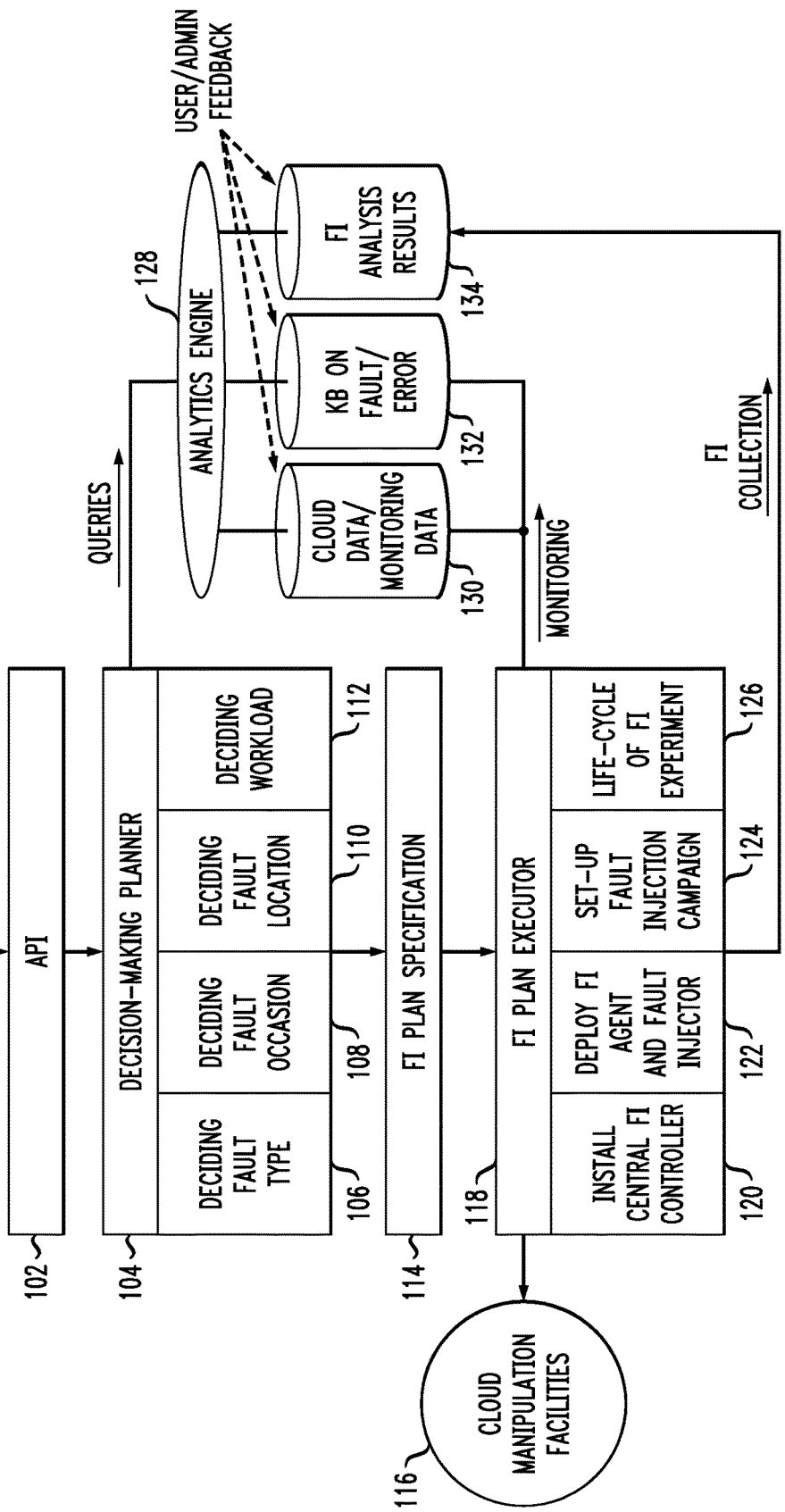
FIG. 1 is a diagram illustrating system architecture, according to an example embodiment of the invention.

FIG. 1 is a diagram illustrating system architecture, according to an embodiment of the invention. By way of illustration, FIG. 1 depicts an FI request submitted by an administrator and/or a customer (with parameters) that is received via an API 102 and forwarded to a decision-making planner component 104 for processing. The parameters of the request may include, as free-form strings or structured data, the target machines for the fault injection, the configuration file for the fault injection (including user name and password, for example), the purpose of the fault injection, guidelines and/or heuristics on fault types, etc. The decision-making planner component 104 includes a sub-component (or engine) 106 for deciding fault type, a sub-component (or engine) 108 for deciding fault occasion, a sub-component (or engine) 110 for deciding fault location, and a sub-component (or engine) 112 for deciding workload. As further detailed herein, the decision-making planner component 104 outputs data to an FI plan specification component 114, which forwards input to an FI plan executor component 118.

The FI plan executor component 118 includes a sub-component 120 for installing a central FI controller, a sub-component 122 for deploying an FI agent and fault injector, a sub-component 124 for setting-up an FI campaign, and a sub-component 126 for managing the life-cycle of an FI experiment. Additionally, the FI plan executor component 118 provides data to cloud manipulation facilities 116 as well as multiple databases. Such cloud manipulation facilities can include VM provisioning capability, image management units, software-defined networking, storage and compute resource controllers, security authentication mechanisms, a workflow orchestrator, etc. Such databases can include, for example, a cloud data and/or monitoring data database 130, a fault and/or error knowledge base 132, and an FI analysis results database 134, all of which can receive feedback from users and/or administrators. By way of example, and as depicted in FIG. 1, the FI plan executor component 118 can provide monitoring data to the cloud data and/or monitoring data database 130 as well as the fault and/or error knowledge base 132. Additionally, the FI plan executor component 118 can provide an FI collection to the FI analysis results database 134.

As additionally illustrated in FIG. 1, cloud data and/or monitoring data database 130, fault and/or error knowledge base 132, and FI analysis results database 134 can each interact with (and receive data from) an analytics engine 128, which receives queries from the decision-making planner component 104.

By way of further description, component 102 exposes an API for external entities to invoke the fault injection service. After receiving a request, component 102 processes the request and assigns a task to the decision-making planner 104. The decision-making planner 104 uses analytics mechanisms to automatically make decisions on fault injection, wherein such decisions can include fault type (via sub-component 106), fault occasion (via sub-component 108), fault location (via sub-component 110) and workload for the fault injection experiments (via sub-component 112). Specifically, component 104 formulates certain queries, issues the queries to the analytics engine 128, obtains responses from the engine 128, and makes decisions based on the responses.

Additionally, component 114 represents an outcome provided by the decision-making planner 104; that is, all decisions made by the planner 104 on fault injection are documented into an FI plan specification 114 in an automated way. Further, component 116 includes the facilities and capabilities provided by the Cloud infrastructure and leveraged by one or more embodiments of the invention for injecting faults. These facilities and capabilities can include VM provisioning capability, image management units, a software-defined network, a storage and compute resource controller, a security authentication, workflow orchestrator, etc. Component 118 executes the FI plan 114 and conducts the real fault injection work by leveraging the cloud manipulation facilities 116. Particularly, in one or more embodiments of the invention, at least four tasks are carried out by component 118: installation of the central FI controller (via sub-component 120), deployment of FI agents and fault injectors onto the target machines (via sub-component 122), setup of the fault injection campaigns (via sub-component 124), and management of the FI experiment lifecycles (via sub-component 126). Moreover, the executor 118 collects monitoring and performance data of the target machines and the cloud environment, as well as the fault injection-related data (for example, fault type, fault occasion, fault location, workload, etc.), and places such data into the cloud data/monitoring data database 130 and the knowledge base on fault/error 132, respectively.

Accordingly, database 130 represents a data repository that stores the collected monitoring and performance data of the target machines and the cloud environment. The collected data can be derived from the FI plan executor 118 and the cloud facilities 116, as well as from the users or admins directly. Also, knowledge base 132 represents a data repository that stores the knowledge on faults and errors and other fault/error related data. The data can be derived from the FI plan executor 118 and the cloud facilities 116, as well as from the users or admins directly. Further, database 134 represents a data repository that stores results of analysis data derived from the analytics engine 128. Such analysis results can be used for future analytics of the analytics engine 128. Moreover, users/admins can use the analysis results for any purpose as well.

As noted above, decision-making planner component 104 includes sub-component 106 for deciding fault type, sub-component 108 for deciding fault occasion, sub-component 110 for deciding fault location, and sub-component 112 for deciding workload. Accordingly, sub-component 106 determines what type of fault to inject. Fault types can include a hardware fault (for example, a broken hardware device, random bit flips, etc.), a network error (for example, a socket that is occupied, not released, and/or forbidden, a misconfigured network firewall, a switch failure, etc.), an application and/or middleware failure (for example, a failure of individual database software processes, a failure of WebSphere processes, etc.), a configuration error (for example, an incorrect setup of database software, an erroneous setup of ports, etc.), and/or incorrect parameters from workloads and/or user inputs.

Additionally, sub-component 106 carries out automated and intelligent decision-making based on, for example, learning what types of errors were encountered for the target machine, system and/or application and for the same type of applications in the literature, as well as based on learning from the history of the target machine, system and/or application accessed from entity-specific databases (as well as other machines, systems and/or applications accessed from separate sources) regarding the distribution of past faults and/or errors of various types. Such decision-making can also be based, for example, on Cloud data pertaining to the target machine, system and/or application.

Based on such learning, sub-component 106 infers one or more rules on given types of variables and configuration values. By way of example, one such rule might include a statement that each digit of an internet protocol (IP) address cannot be more than 255. Also, in addition to using random fault values, at least one embodiment of the invention includes using correct fault types and correct fault values derived from above-noted learnings to reduce an FI space.

Further, as noted above, sub-component 108 determines when to inject a fault. Accordingly, sub-component 108 carries out automated and intelligent decision-making based on, for example, observed and extracted (from relevant entity-specific databases, for example) scenarios of error occurrences that were encountered for the target machine, system and/or application and for the same type of machines, systems and/or applications as encountered in other data sources. The observed and extracted results may be manually obtained by users via personal insights and/or interactive tool-aided inspection, or may be automatically obtained through one or more monitoring tools and/or discovery tools.

Sub-component 108 also carries out smart profiling of the target machine, system and/or application to identify one or more occasion points of known applications and/or middleware. For example, certain applications and/or middleware have different stages, and such knowledge for known applications and/or middleware can be leveraged by the fault injection service via sub-component 108. Further, in at least one embodiment of the invention an FI occasion determination can be linked with or to certain stages. Also, in a controlled environment (such as, for example, a Cloud environment), at least one embodiment of the invention can include leveraging monitoring infrastructure and known attributes and/or tags available for the target machine, system and/or application. For example, certain applications and/or middleware have different stages (for example, connecting, request received, metadata retrieved, etc.), wherein the stage information is encoded as an attribute or a tag available to the controlled environment. The knowledge for the known applications and/or middleware can be leveraged by the fault injection service.

Additionally, one or more embodiments can also include problem-driven profiling, wherein the user and/or administrator can specify what problems and/or which parts of the machine, system and/or application should be the focused in a given FI study. In studying focused problems or parts of the target machine, system and/or application, at least one embodiment of the invention includes locating and/or identifying the correct workloads and inputs during profiling, and then identifying the correct fault occasions from the profiling. One example technique for identifying correct workloads and inputs is to implement the FI service to launch different types of workloads with different inputs, and to monitor whether the focused parts or the parts related to the focused problems are involved during the workload execution. The monitored results can be saved so that when the FI service handles another fault injection request, these results can be used as reference to help determine the correct workload and input. Additionally, one example technique for identifying correct fault occasions is to only limit fault occasions to those occasions when focused parts are executing.

Referring again to decision-making planner component 104, sub-component 110 determines where (for example, which target component) and what item (for example, specific values and/or variables) into which to inject the fault. Also, sub-component 110 carries out automated and intelligent decision-making based on, for example, observing and extracting (from relevant entity-specific databases, for example) a distribution of error locations for the target machine, system and/or application, as well as for similar types of machines, systems and/or applications from separate data sources. Accordingly, such distributions of different error locations and/or target components can be inferred by learning from historical data such as, for example, past error behavior of the target machine, system and/or application as well as other similar machines, systems and/or applications. Such error behavior can include observations of system logs and application logs, monitored message flows, a dump of call stacks at the failure point, an application output, a metadata record in middleware database, etc.

In accordance with one or more embodiments of the invention, there can be multiple fault locations for the same type of error. By way of example, for a network error, at least one embodiment of the invention can include injecting into a switch, a network interface controller (NIC), a device driver, a system call, a socket library, a library call, an application, etc. Such fault location determinations can be made based on, for example, learning from Cloud data on target machines, systems and/or applications, as well as on learning from a knowledge base on faults and/or errors (such as KB 132 in FIG. 1) pertaining to a multitude of systems.

Also, at least one embodiment of the invention includes prioritizing injection of multiple faults given constraints of time and/or cost, as well as given aims to improve FI efficiency. Such prioritization can be based, for example, on the probability of the given faults, impact (severity) of the given faults, and/or the cost associated with the given faults (in terms of central processing unit (CPU), memory, disk, monetary expense, etc.).

In identifying the value and/or variable into which to inject a given fault, at least one embodiment of the invention includes identifying a set of values and/or variables from the target component and selecting a value from the set. Such a value might include, for example, a configuration attribute value, a variable in the stack, a value in the control flow, etc. In one or more embodiments of the invention, an exact variable need not be utilized for evaluating resilience.

Referring again to the decision-making planner component 104 in FIG. 1, sub-component 112 determines the workload, that is, the type of request mix and the amount of the load (for example, requests per minute). Additionally, sub-component 112 carries out automated and intelligent decision-making based on, for example, automatically extracting workload data from historical data pertaining to typical workloads for the target machine, system and/or application, as well as for the same type of machines, systems and/or applications. By way of example, such extracting can result in repeating the average workload of the past week and/or month for a given machine, system and/or application.

In one or more embodiments of the invention, target components (such as fault locations) can be associated with certain types of workloads. For example, if the injection of faults into migration components is desired, a migration workload can be utilized. By way of further example, if the injection of resource-exhaustion faults is desired, heavy workloads can be utilized. Such an embodiment of the invention can include implementing and maintaining a table between fault components and (type, amount of) workloads.

Referring back to FIG. 1, component 114 generates the specification of a given fault injection plan. Such a specification can be based, for example, on data pertaining to fault occasions (such data pertaining to a sequence of events such as various functions, matching of data, etc.), data pertaining to fault type, and data pertaining to fault location. Additionally, an FI plan can include a specification of a given fault injection experiment, a specification of the workload for each fault injection experiment, steps of automatic deployment of the test bed and fault injection infrastructure and/or tools, a strategy for driving the life-cycle of an FI experiment from beginning to end (which can include, for example, creating the scripts for each step in the life-cycle), and documenting the monitoring tools and logs that are leveraged for collecting data.

As additionally noted above in connection with the description of FIG. 1, the FI plan executor component 118 includes sub-component 120 for installing a central FI controller, sub-component 122 for deploying an FI agent and fault injector, sub-component 124 for setting-up an FI campaign, and sub-component 126 for managing the life-cycle of an FI experiment. Fault injection requires precise coordination of the FI campaign setup, workload execution, interception and injection of the fault injector, especially when the workload involves multiple machines' execution. Therefore, a central controller is typically created in conducting fault injection. In the example embodiment of the invention depicted in FIG. 1, sub-component 120 installs the central FI controller. Accordingly, via sub-component 122 and sub-component 124, the FI plan executor component 118 can carry out deployment and experiment setup of an FI plan. As detailed herein, a fault injection plan specifies steps of automatic deployment of the test bed and fault injection infrastructure and/or tools. The FI plan executor component 118 invokes the corresponding scripts and workflows (via sub-component 122) to carry out the automatic deployment using Cloud capabilities.

Additionally, the FI plan executor component 118 drives the life-cycle of fault injection experiment via sub-component 126. Such actions include initializing the test bed machines and saving the VM images of the initialized machines. Such initialization includes installing the FI infrastructures and tools as well as Cloud monitoring tools onto the machines with the target applications and/or systems. Also, initialization includes generating scripts for the life-cycle, which can include, for example, scripts for starting the saved VM images, starting the workload, injecting the fault, waiting for experiment completion, and copying the logs and monitoring data.

At least one embodiment of the invention additionally includes providing a set of fault injector primitives for changing certain types of values. Such fault injector primitives can include, for example, simple fault injector primitives for certain simple fault types (such as process crashes, etc.), as well as complicated fault injectors for certain fault types (such as communication errors, incorrect return values, etc.). Additionally, at least one embodiment of the invention can include incorporating custom fault injector primitives provided by users and/or administrators.

Also, one or more embodiments of the invention include implementing low-latency detection of experiment completeness, which utilizes monitoring tools to efficiently determine experiment completeness. Additionally, in at least one embodiment of the invention, feedback from the FI plan executor component 118 can be applied as input to the decision-making for refinement. Feedback from the FI plan executor 118 is stored in the data repositories 130 and 132. Subsequently, the decision-making planner 104 can use the feedback stored in repositories 130 and 132 to perform refined decision-making.

Further, as detailed herein, intelligent FI result analysis is carried out by analytics engine 128. In one or more embodiments of the invention, the analytics engine 128 combines multiple analysis methods to answer reliability-related queries and questions. Such analysis methods can include, for example, generating histograms of outcome cases (with crash, hang, fail-silent violation, success, and finer outcome categories), log correlation for tracing error propagation, clustering faults or failures, correlation analysis among fault type, outcome category, varied workload scenarios, different metrics, etc. Such an embodiment of the invention includes selecting a particular combination of analysis methods for supplying answers to given queries. In at least one embodiment of the invention, a query-specific combination of methods will be used.

Also, in one or more embodiments of the invention, the analytics engine 128 can implement a long-term analysis. By way of example, if a fault injection is run multiple times at different times, different outcomes may result, and such data can be used for long-term analysis. Additionally, at least one embodiment of the invention can include automatically scheduling fault injection experiments based on certain conditions and/or temporal parameters. Example conditions can include a new code release, a certain period of time in software aging, etc., and example temporal parameters can include time elapsed between fault injections.

Figure 2:
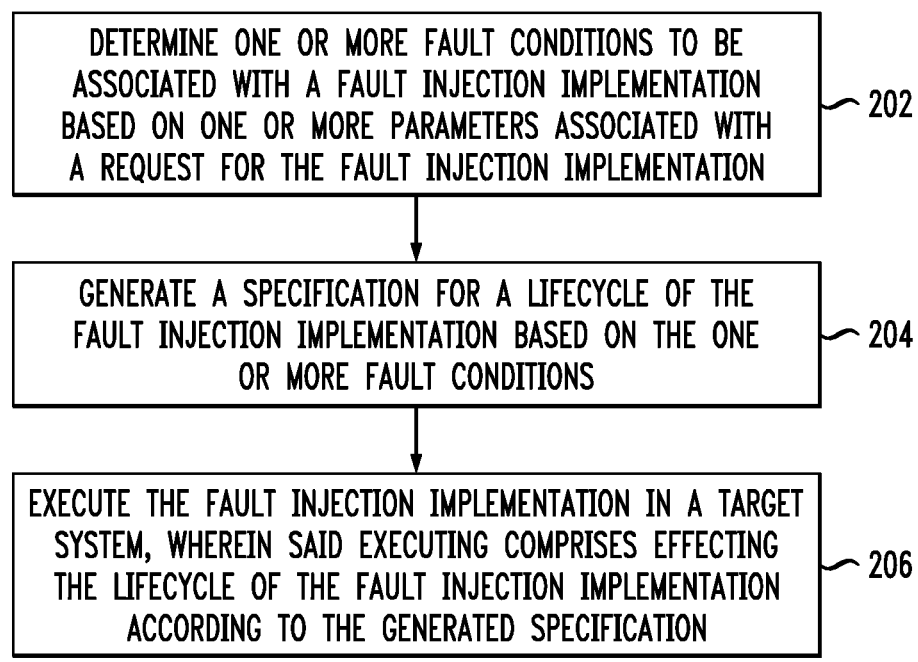
FIG. 2 is a flow diagram illustrating techniques according to an embodiment of the invention.

FIG. 2 is a flow diagram illustrating techniques according to an embodiment of the present invention. Step 202 includes determining one or more fault conditions to be associated with a fault injection implementation based on one or more parameters associated with a request for the fault injection implementation, wherein said determining is carried out automatically by a decision-making component executing on a hardware processor. The fault conditions can include fault type, fault occasion, fault location, and/or target system workload. Additionally, the one or more parameters associated with the request can include identification of the target system.

Determining the one or more fault conditions can also be based, for example, on feedback provided by an individual issuing the request, input provided by a knowledge based system (for surveying literature to determine fault conditions), input provided by an error detection system, and/or input provided by a cloud monitoring system. Additionally, determining the one or more fault conditions can include ranking multiple fault conditions based on one or more variables. Such variables can include, for example, a likelihood of each of the multiple fault conditions causing the target system to fail, severity of failures caused by each of the multiple fault conditions, a frequency of usage of each of the multiple fault conditions in systems analogous to the target system, a frequency of past usage of each of the multiple fault conditions in the target system, and/or one or more user-specified rules.

Step 204 includes generating a specification for a lifecycle of the fault injection implementation based on the one or more fault conditions, wherein said generating is carried out automatically by a fault injection specification component executing on the hardware processor and communicatively linked to the decision-making component. Step 206 includes executing the fault injection implementation in a target system, wherein said executing comprises effecting the lifecycle of the fault injection implementation according to the generated specification, and wherein said executing is carried out automatically by a fault injection execution component executing on the hardware processor and communicatively linked to the decision-making component and the fault injection specification component.

The techniques depicted in FIG. 2 can additionally include monitoring one or more predetermined items of data during the fault injection implementation in the target system, and outputting the one or more predetermined items of data monitored during the fault injection implementation to a database. Further, in at least one embodiment of the invention, step 202, step 204, and/or step 206 can be provided as a cloud-based service.

Also, an additional embodiment of the invention includes determining a set of multiple fault conditions to be associated with a target system fault injection implementation based on one or more parameters associated with a request for the fault injection implementation, wherein said set of multiple fault conditions comprises at least: (i) fault type, (ii) fault occasion, (iii) fault location, and (iv) target system workload, and wherein said determining is carried out by a decision-making component executing on a hardware processor. Such an embodiment also includes generating a specification for a lifecycle of the fault injection implementation based on the set of multiple fault conditions, wherein said generating is carried out by a fault injection specification component executing on the hardware processor and communicatively linked to the decision-making component. Additionally, such an embodiment includes executing the fault injection implementation in the target system, wherein said executing comprises effecting the lifecycle of the fault injection implementation according to the generated specification, and wherein said executing is carried out by a fault injection execution component executing on the hardware processor and communicatively linked to the decision-making component and the fault injection specification component. Further, such an embodiment includes monitoring one or more predetermined items of data during the fault injection implementation in the target system, and outputting the one or more predetermined items of data monitored during the fault injection implementation to a database executing on the hardware processor and communicatively linked to the execution component.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 3:
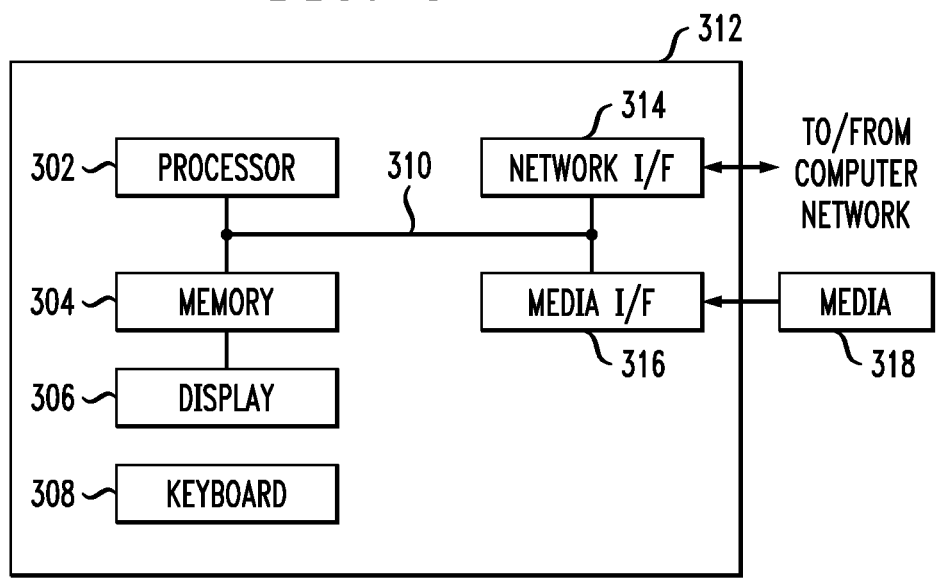
FIG. 3 is a system diagram of an exemplary computer system on which at least one embodiment of the invention can be implemented.

Additionally, an aspect of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions and/or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one aspect of the present invention may provide a beneficial effect such as, for example, performing automatic fault injection upon target machines, systems and/or applications to minimize user intervention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining one or more fault conditions to be associated with a fault injection implementation based on one or more parameters associated with a request for the fault injection implementation, wherein said determining is carried out automatically by a decision-making component executing on a hardware processor, and wherein said determining the one or more fault conditions to be associated with the fault injection implementation comprises ranking multiple fault conditions based on one or more variables;
    generating a specification for a lifecycle of the fault injection implementation based on the one or more fault conditions, wherein said generating is carried out automatically by a fault injection specification component executing on the hardware processor and communicatively linked to the decision-making component; and
    executing the fault injection implementation in a target system, wherein said executing comprises effecting the lifecycle of the fault injection implementation according to the generated specification, and wherein said executing is carried out automatically by a fault injection execution component executing on the hardware processor and communicatively linked to the decision-making component and the fault injection specification component.

2. The method of claim 1, wherein the one or more fault conditions comprises fault type.

3. The method of claim 1, wherein the one or more fault conditions comprises fault occasion.

4. The method of claim 1, wherein the one or more fault conditions comprises fault location.

5. The method of claim 1, wherein the one or more fault conditions comprises target system workload.

6. The method of claim 1, wherein the one or more parameters associated with the request comprise identification of the target system.

7. The method of claim 1, wherein said determining further comprises determining the one or more fault conditions to be associated with the fault injection implementation based on feedback provided by an individual issuing the request.

8. The method of claim 1, wherein said determining further comprises determining the one or more fault conditions to be associated with the fault injection implementation based on input provided by a knowledge based system.

9. The method of claim 1, wherein said determining further comprises determining the one or more fault conditions to be associated with the fault injection implementation based on input provided by an error detection system.

10. The method of claim 1, wherein said determining further comprises determining the one or more fault conditions to be associated with the fault injection implementation based on input provided by a cloud monitoring system.

11. The method of claim 1, wherein the one or more variables comprises a likelihood of each of the multiple fault conditions causing the target system to fail.

12. The method of claim 1, wherein the one or more variables comprises severity of failures caused by each of the multiple fault conditions.

13. The method of claim 1, wherein the one or more variables comprises a frequency of usage of each of the multiple fault conditions in systems analogous to the target system.

14. The method of claim 1, wherein the one or more variables comprises a frequency of past usage of each of the multiple fault conditions in the target system.

15. The method of claim 1, wherein at least one of (i) said determining, (ii) said generating, and (iii) said executing is a cloud-based service.

16. The method of claim 1, comprising:
    monitoring one or more predetermined items of data during the fault injection implementation in the target system.

17. The method of claim 16, comprising:
    outputting the one or more predetermined items of data monitored during the fault injection implementation to a database.

18. A computer program product, the computer program product comprising a computer readable storage medium having program instructions embodied therewith, the program instructions executable by a computing device to cause the computing device to:
    determine one or more fault conditions to be associated with a fault injection implementation based on one or more parameters associated with a request for the fault injection implementation, wherein said determining the one or more fault conditions to be associated with the fault injection implementation comprises ranking multiple fault conditions based on one or more variables;
    generate a specification for a lifecycle of the fault injection implementation based on the one or more fault conditions; and
    execute the fault injection implementation in a target system, wherein said executing comprises effecting the lifecycle of the fault injection implementation according to the generated specification.

19. A system comprising:
    a memory; and at least one processor coupled to the memory and configured for:
- determining one or more fault conditions to be associated with a fault injection implementation based on one or more parameters associated with a request for the fault injection implementation, wherein said determining the one or more fault conditions to be associated with the fault injection implementation comprises ranking multiple fault conditions based on one or more variables;
- generating a specification for a lifecycle of the fault injection implementation based on the one or more fault conditions; and
- executing the fault injection implementation in a target system, wherein said executing comprises effecting the lifecycle of the fault injection implementation according to the generated specification.

\* \* \* \* \*